US007600684B2

(12) United States Patent
Tobin et al.

(10) Patent No.: US 7,600,684 B2
(45) Date of Patent: Oct. 13, 2009

(54) DIRECT THERMAL BARCODE PRINTER

(75) Inventors: Dwayne Tobin, Longwood, FL (US); William M. Bouverie, Windemere, FL (US); Kenneth Colonel, Oviedo, FL (US); Paul Plasschaert, Maitland, FL (US); Kim Wilson, Orlando, FL (US)

(73) Assignee: Datamax Corporation, Orlando, FL (US)

(*) Notice: Subject to any disclaimer, the term of this patent is extended or adjusted under 35 U.S.C. 154(b) by 18 days.

(21) Appl. No.: 11/491,798

(22) Filed: Jul. 24, 2006

(65) Prior Publication Data

US 2006/0263138 A1 Nov. 23, 2006

Related U.S. Application Data

(63) Continuation-in-part of application No. 11/103,105, filed on Apr. 11, 2005, now Pat. No. 7,131,778.

(51) Int. Cl.
*G06F 3/12* (2006.01)

(52) U.S. Cl. ....................... 235/432; 347/104; 358/498; 358/492; 355/72; 355/64; 400/613

(58) Field of Classification Search .................. 235/432
See application file for complete search history.

(56) References Cited

U.S. PATENT DOCUMENTS

| | | | | |
|---|---|---|---|---|
| 2,250,025 | A | 7/1941 | Klein | |
| 3,662,681 | A | 5/1972 | Smith | |
| 4,105,168 | A | 8/1978 | Rutherford | |
| 4,913,367 | A | 4/1990 | Hata | |
| 4,948,064 | A | 8/1990 | Richard | |
| 4,979,835 | A | 12/1990 | Beck et al. | |
| 5,025,998 | A | 6/1991 | Hutzenlaub et al. | |
| 5,322,377 | A * | 6/1994 | Asai | 400/55 |
| 5,354,139 | A * | 10/1994 | Barrus et al. | 400/616.1 |
| 5,472,153 | A | 12/1995 | Crowley et al. | |
| 5,486,259 | A | 1/1996 | Goodwin et al. | |
| 5,683,545 | A | 11/1997 | Goodwin et al. | |
| 5,800,669 | A | 9/1998 | Goodwin et al. | |
| 5,813,343 | A | 9/1998 | Harb | |
| 5,833,800 | A | 11/1998 | Goodwin et al. | |
| 5,900,110 | A | 5/1999 | Goodwin et al. | |
| 5,906,443 | A | 5/1999 | Goodwin et al. | |
| 6,068,418 | A * | 5/2000 | Fox | 400/579 |
| 6,158,342 | A * | 12/2000 | Moore | 101/407.1 |
| 6,279,638 | B1 | 8/2001 | Goodwin et al. | |
| 6,431,492 | B1 * | 8/2002 | Chillscyzn | 242/577 |
| 6,497,466 | B1 | 12/2002 | Writt | |
| 6,712,112 | B2 | 3/2004 | Goodwin et al. | |
| 6,805,183 | B2 | 10/2004 | Goodwin et al. | |
| 2002/0059984 | A1 | 5/2002 | Goodwin et al. | |
| 2002/0175985 | A1 | 11/2002 | Zevin et al. | |
| 2003/0205863 | A1 * | 11/2003 | Yang | 271/264 |
| 2004/0069166 | A1 | 4/2004 | Goodwin et al. | |
| 2005/0002715 | A1 * | 1/2005 | Fries et al. | 400/88 |
| 2005/0002722 | A1 | 1/2005 | Goodwin et al. | |
| 2006/0039732 | A1 | 2/2006 | Huggins | |

* cited by examiner

*Primary Examiner*—Daniel Walsh
*Assistant Examiner*—Tae W Kim
(74) *Attorney, Agent, or Firm*—Carter, DeLuca, Farrell & Schmidt, LLP

(57) ABSTRACT

A direct thermal barcode printer including a print assembly is provided. The print assembly is movably positioned relative to a print media for adjusting printing characteristics of an attached print head.

10 Claims, 12 Drawing Sheets

DIRECT THERMAL BARCODE PRINTER

CROSS-REFERENCE TO RELATED APPLICATIONS

This application is a continuation-in-part of U.S. patent application Ser. No. 11/103,105, filed on Apr. 11, 2005 now U.S. Pat. No. 7,131,778, the disclosure of which is hereby incorporated by reference herein in its entirety.

BACKGROUND OF THE INVENTION

1. Field of the Invention

The present disclosure relates to printers in general and, more particularly, to a direct thermal barcode printer.

2. Description of the Related Art

The use of electronically controlled thermal printers has increased very rapidly over the last few years. In particular, the market for thermal label printers has shown significant improvement with users focusing on utilizing label printing, especially bar-code labeling, to improve capital asset management, inventory control or time and attendance reporting—or to meet corporate or industry mandated labeling requirements—such as automotive AIAG, electronic EIA, or retail UCC/UPC specifications. Label printers typically incorporate a media supply of "peel away" labels adhered to a coated substrate wound in a rolled configuration. The media with the labels is drawn against a printing head, which causes images to be created on the label in response to localized heating of the printing head.

In some prior art printers, calibration or alignment of the print head with respect to the different print media types is complicated and may require the printer to be returned to the factory or a service center. This may result in additional costs to the customer as well as increased "down-time" or availability of the printer. Therefore, a need exists for a printer that may be calibrated or aligned at the customer's location.

SUMMARY OF THE INVENTION

A direct thermal barcode printer is hereinafter disclosed. According to an embodiment of the disclosure, the direct thermal barcode printer includes a base, a platen bracket, and a cover releasably attached to the platen bracket. A printed circuit board is attached to the platen bracket and the combination is removably positioned in the base. A media storage assembly, a media guide assembly, and a carrier assembly are also removably attached to the platen bracket.

In particular, the media storage assembly is adapted to receive a quantity of a print media and position the print media for printing. The media storage assembly includes first and second support members that are positionable along an axis of the platen bracket and generally biased by springs towards a center of the platen bracket thereby securing the print media in the media storage assembly. First and second support members may lock in position after a desired amount of movement away from the center of the platen bracket thereby facilitating the installation and/or removal of the print media in the media storage assembly. Additionally, movement of the first and second support members may be synchronized such that when a support member is moved a distance from the center of the platen bracket, the other support member moves a corresponding distance in the opposing direction from the center of the platen bracket.

The media guide assembly includes first and second guide portions that are movable towards and away from each other to define a media path therebetween. Each guide portion includes first and second openings at opposed ends of the guide portion with a channel portion disposed between the first and second openings. As assembled, first and second openings of each guide portion define first and second openings of the media guide assembly. In addition, the first and second channel portions define a channel through the media guide assembly for receiving a quantity of the print media therethrough. One of the guide portions may include a sensor for detecting the presence or absence of the print media. Additionally, movement of the first and second guide members may be coordinated such that when a guide member is moved a distance from the center of the platen bracket, the other guide member moves a corresponding distance in the opposing direction from the center of the platen bracket. A roller is disposed near one of the openings of the media guide assembly for advancing or retracting a quantity of the print media.

A carrier assembly is positioned atop a portion of the platen bracket such that is proximal to the roller. The carrier assembly includes a carrier bracket having a pair of carrier latches. A print assembly, a print adjustment assembly, and a pressure adjustment assembly are attached to the carrier bracket. Carrier latches include torsion springs and fingers for biasing the carrier assembly towards the platen bracket during printing operations. The print assembly is most proximal to the roller and includes an adapter plate and a print head attached thereto. One or more print head cables may be connected to the print head for communicating data to and/or from the print head. The adapter plate includes first and second shaft brackets and a pivot bracket adapted to receive a shaft therethrough. In one embodiment, the pivot bracket has an open side.

The print adjustment assembly, in cooperation with the carrier bracket, includes a shaft and one or more thumbwheels rotatably attached to the carrier bracket. Rotation of one thumbwheel urges the shaft longitudinally within an elongate opening of the carrier bracket. As the shaft contacts a surface of either shaft bracket without contacting a surface of the pivot bracket, the adapter plate is pivoted causing it to skew with respect to the roller. In one embodiment, two thumbwheels are included that are independently rotatable for precisely aligning the print head to the print media and the roller. In another embodiment, the thumbwheels are adapted for engaging correspondingly dimensioned holes in the platen bracket for releasably positioning the carrier assembly in the platen bracket.

The print head is rotatably mounted to the carrier bracket allowing repositioning of the print head towards and away from the roller. The pressure adjustment assembly includes a hub and at least one compression spring disposed between the hub and the carrier bracket. A ridge disposed on an outer surface of the hub interacts with at least one pointer on the carrier bracket such that rotation of the hub compresses or decompresses the at least one compression spring such that the print head applies more or less pressure, respectively, to the print media, thereby adjusting the printing pressure.

BRIEF DESCRIPTION OF THE DRAWINGS

Embodiments of the presently disclosed direct thermal barcode printer are described herein with reference to the drawings, wherein.

DETAILED DESCRIPTION OF THE PREFERRED EMBODIMENTS

Figure 1:
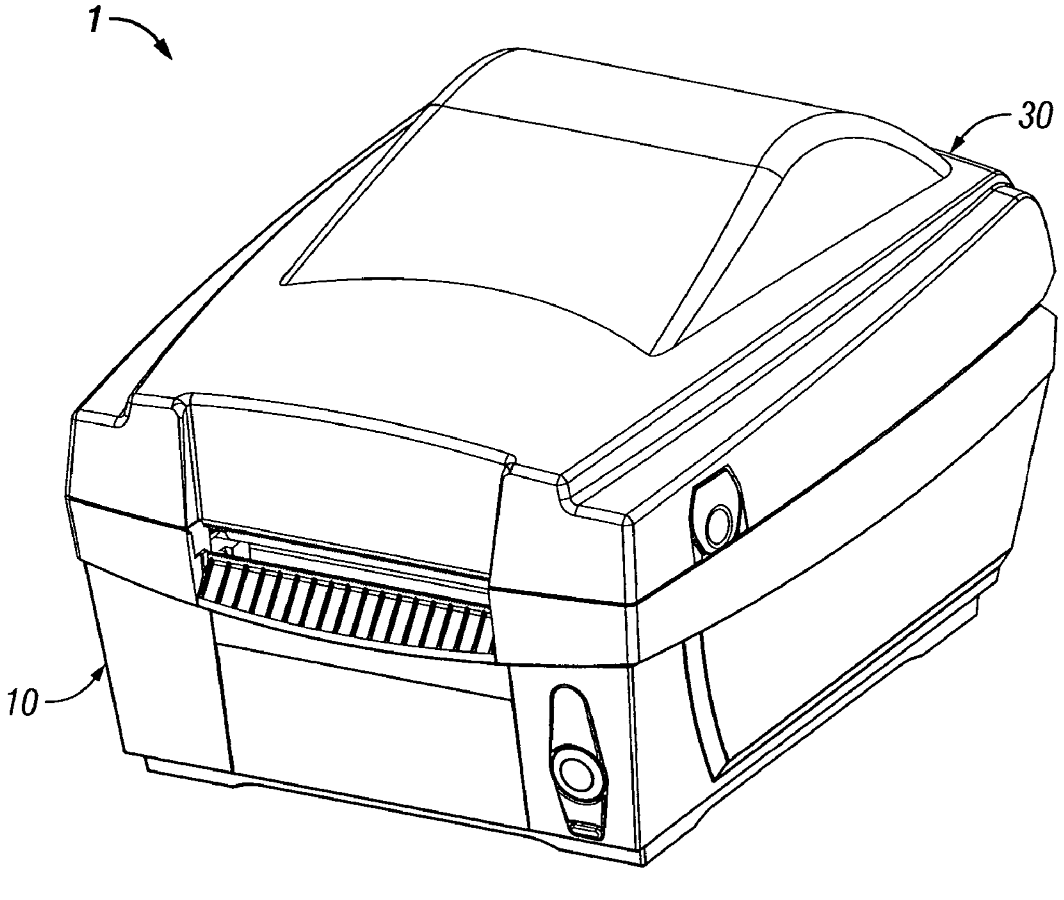
FIG. 1 is a front perspective view of an assembled direct thermal barcode printer in accordance with an embodiment of the present disclosure.

Embodiments of the presently disclosed direct thermal barcode printer will now be described in detail with reference to the drawings, in which like reference numerals designate identical or corresponding elements in each of the several views.

Figure 2:
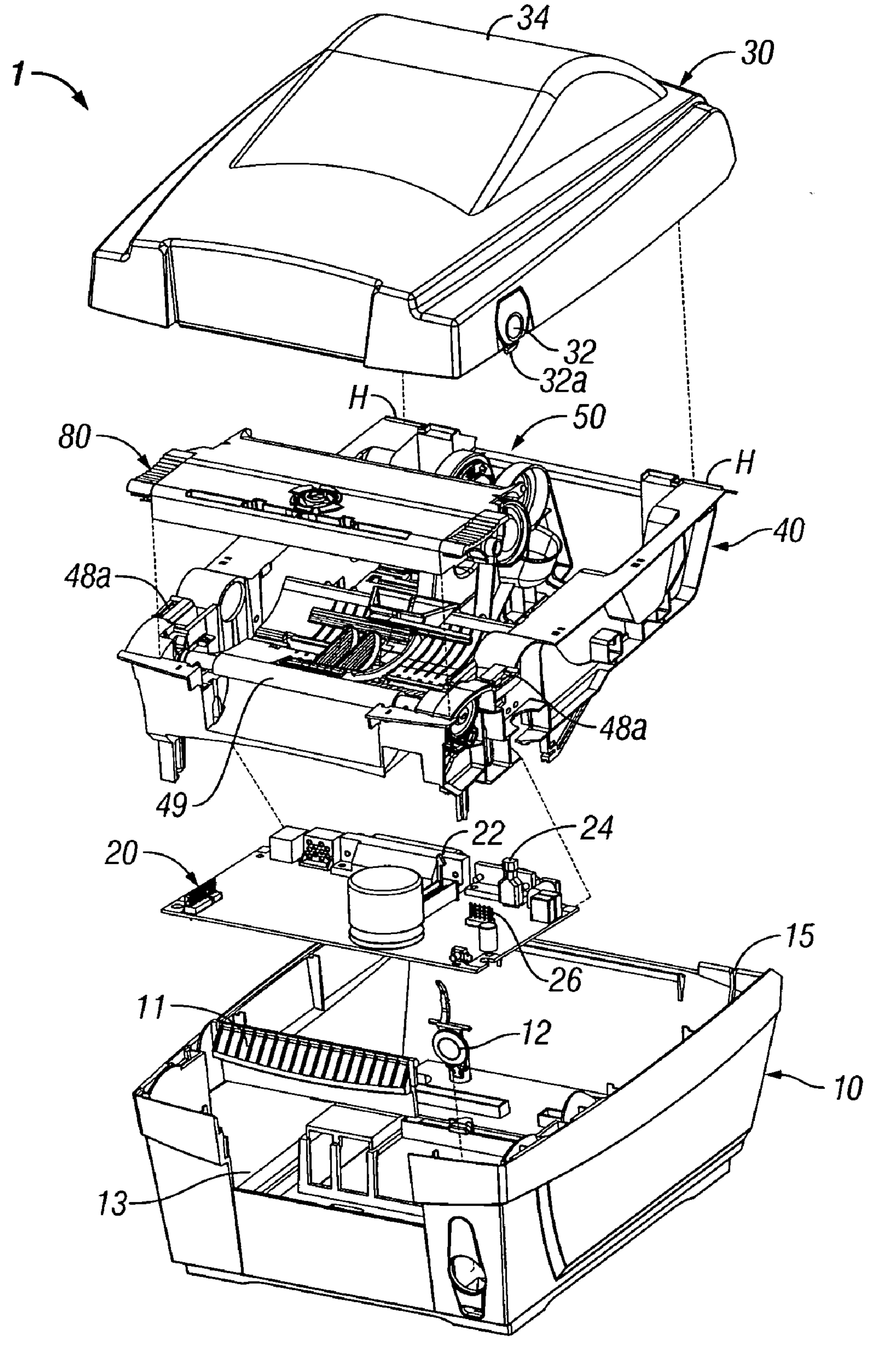
FIG. 2 is an exploded front perspective view of the direct thermal barcode printer of FIG. 1.
Figure 3:
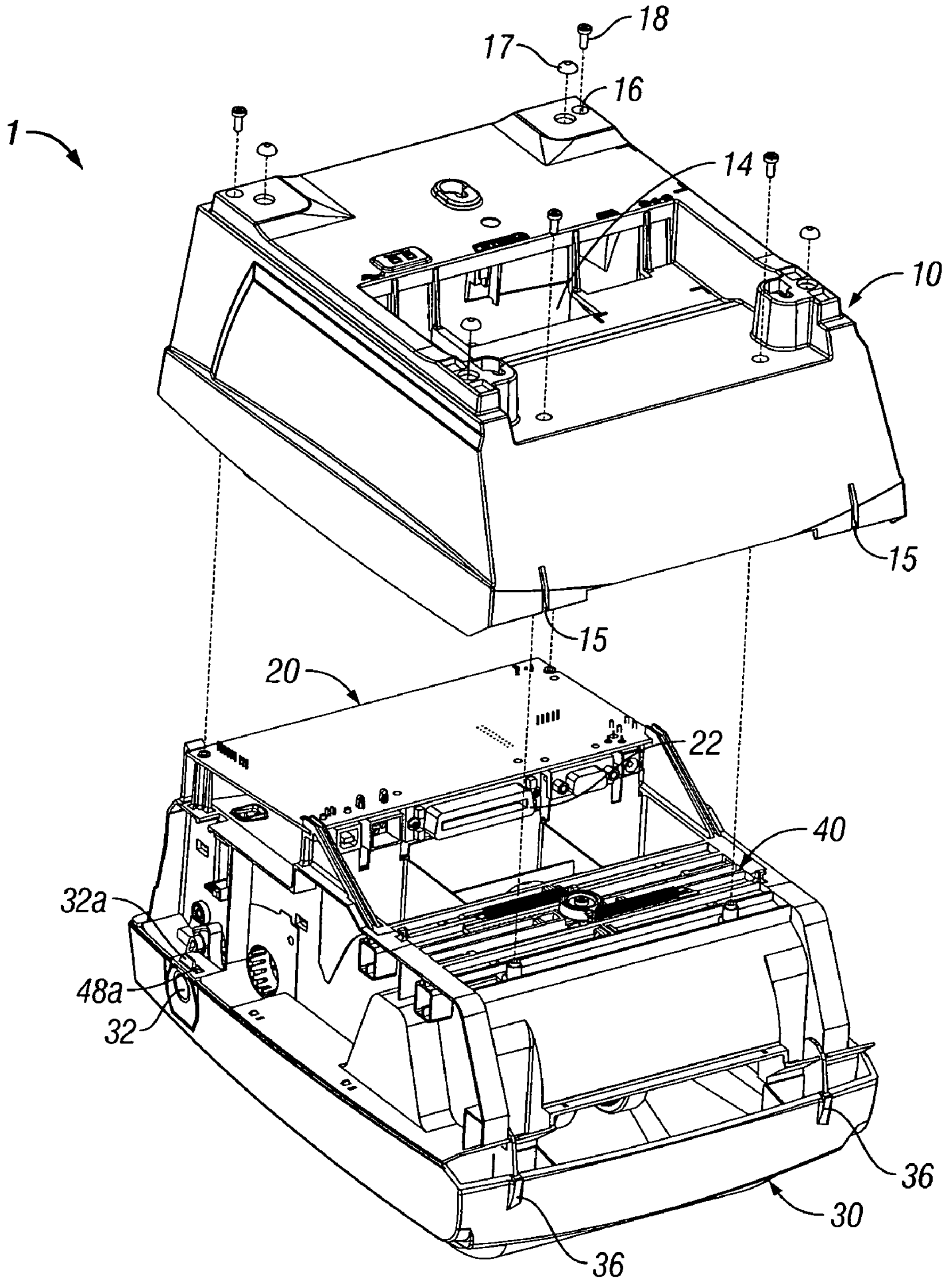
FIG. 3 is an exploded perspective view of the direct thermal barcode printer of FIG. 1 in an inverted position.

Referring initially to FIG. 1, the direct thermal barcode printer, shown generally as 1, includes a base 10 and a cover 30. Printer 1 is supplied with power from an electrical source (not shown). The electrical source of power may be AC or DC depending on the desired configuration of printer 1. A more detailed view of printer 1 is shown in FIG. 2. A front face of base 10 includes a fascia plate 11 that is adapted to fit within an opening 13 that is defined along the front face of base 10. A switch or a button 12 is positioned on the front face of base 10 and is in electrical communication with a printed circuit board 20 that is disposed within base 10. Button 12 is capable of controlling operations of printer 1 such as pause, resume, or feed. An interface connection 22 is located along one edge of printed circuit board 20 and is accessible from the exterior of the assembled printer 1 (FIG. 3). Interface connection 22 may be coupled to a control cable (not shown) that allows either unidirectional or bidirectional flows of data and/or control signals to local control circuitry on printed circuit board 20. In one embodiment of printer 1, local control circuitry on printed circuit board 20 controls and manages all operations of printer 1. Printed circuit board 20 may also include a grounding lug 24 and a connector 26 that will be discussed in further detail hereinafter.

Printed circuit board 20 is attached to a bottom portion of platen bracket 40 as seen in FIG. 3. Platen bracket 40 includes a media storage assembly 50 and a carrier assembly 80 that will be described in further detail hereinbelow. Cover 30 is configured and adapted for releasably engaging a top portion of platen bracket 40 and includes latches 32 and a dome 34. Dome 34 is an enlarged section of a top surface of cover 30 and is generally configured to allow cover 30 and platen bracket 40 to be attached to base 10 without contacting or interfering with a supply of a print media that is disposed within printer 1. Additionally, cover 30 is hingedly attached to a rear portion of platen bracket 40 at hinge regions H using structures as are known to those of skill in the art. Therefore, cover 30 may be pivoted or rotated about hinge sections H such that components on platen bracket 40 are accessible.

Although only one latch 32 is shown in FIG. 2, a corresponding latch 32 is disposed on an opposing side of cover 30. Each latch 32 includes a tab 32*a* and is normally biased for engaging slots 48*a* in platen bracket 40 (FIG. 2). Actuation of latch 32 overcomes the bias such that tab 32*a* does not engage slot 48*a* and cover 30 may be pivoted about hinge sections H or separated from platen bracket 40. Conversely, the normal bias of latch 32 urges tab 32*a* to engage a portion of slot 48*a* thereby securing cover 30 to platen bracket 40. Further still, cover 30 includes projections 36 (FIG. 3) that cooperate with slits 15 in base 10. In particular, after printer 1 is assembled (i.e. cover 30 is secured to platen bracket 40 and base 10 is attached to platen bracket 40), cover 30 may be pivoted about hinge sections H, but is inhibited from being removed from printer 1 as projections 36 are captivated by slits 15 in base 10. This arrangement allows access to components beneath cover 30 and inhibits removal of cover 30 when base 10 is installed.

Referring now to FIG. 3, platen bracket 40, printed circuit board 20, and cover 30 are shown assembled and inverted. As discussed previously, printed circuit board 20 is attached to platen bracket 40. Cover 30 is releasably attached to platen bracket 40 using latches 32 as discussed hereinabove. Once assembled, printed circuit board 20, platen bracket 40, and cover 30 are joined to base 10 using a plurality of fasteners 18 that are received in holes 16. This arrangement maintains the components in their respective spatial relationships within printer 1.

Additionally, a plurality of feet 17 is disposed along a bottom surface of base 10 to minimize movement of printer 1 after it is placed in a desired location. A slot 14 is defined along a rear-facing surface near a bottom surface of base 10. Slot 14 is configured and dimensioned to receive interface connection 22 such that interface connection 22 is accessible from the exterior of the assembled printer 1.

Platen bracket 40 will now be described in detail with reference to FIGS. 4-6. A media storage assembly 50 and a media guide assembly 70 are disposed within platen bracket 40. A motor 46 is located in a well along a wall of platen bracket 40 and is operatively coupled to idler gear 45. Motor 46 may be supplied from an AC or a DC power source and is electrically coupled to grounding lug 24 on printed circuit board 20 (FIG. 2) through ground cable 47. Energizing motor 46 rotates a gear (not shown) on motor 46 causing rotation of idler gear 45, which is press mounted on post 39, thereby imparting rotary motion to drive gear 42 for supplying a motive force to a roller 49 that is positioned in the vicinity of an output of media guide assembly 70. Roller 49 is rotatable in response to rotation of drive gear 42 thereby providing motive force to advance or retract a quantity of print media 53. Idler gear 45 and drive gear 42 are rotatably attached to platen bracket 40 using bearings 43*a* and 43*b* respectively. A gear cover 44 may be included. A pair of generally elongate recesses 48 is disposed along outer regions of platen bracket 40 in the vicinity of roller 49.

Media storage assembly 50 includes spaced apart first and second support members 51*a*, 51*b* each of which include a disc 52*a*, 52*b* that is adapted for engaging a portion of media supply 53. Media supply 53 may include a support tube 53*a* that engages discs 52*a*, 52*b* such that media supply 53 is rotatable on discs 52*a*, 52*b* thereby allowing print media to be fed from media supply 53. In another embodiment, first and second support members 51*a*, 51*b* also include additional discs 52*c*, 52*d*, respectively, that are configured and dimensioned for engaging a differently dimensioned media supply 53. By way of example only, discs 52*a*, 52*b* may be configured for rotatably receiving support tube 53*a* having a diameter of approximately 1 inch whereas discs 52*c*, 52*d* may be configured for rotatably receiving support tube 53*a* having a diameter of approximately 1.5 inches. In addition, mounting plates 54*a*, 54*b*, each having at least one foot 55, are attached to a bottom portion of support members 51*a*, 51*b*. Toothed members 56*a*, 56*b* are attached to respective mounting plates 54*a*, 54*b* and are generally elongate structures that are attached transverse to respective support members 51*a*, 51*b*. Support members 51*a*, 51*b* are positionable towards and away from each other as described in detail hereinbelow.

Media guide assembly 70 includes spaced apart first and second guide portions 71*a*, 71*b* that are also positionable towards and away from each and will be discussed in detail hereinafter. More specifically, guide portions 71*a*, 71*b* include channel portions 76*a*, 76*b* that are generally arcuately shaped. Channel portions 76*a*, 76*b* have respective first open portions 77*a*, 77*b* and respective second open portions 78*a*, 78*b*. When media guide assembly 70 is installed in platen bracket 40, first open portions 77*a*, 77*b* define a first open end 77, second open portions 78*a*, 78*b* define a second open end 78, and channel portions 76*a*, 76*b* define a channel 76 extending between open ends 77, 78. First and second open ends 77, 78 in conjunction with channel 76 define a media path. The spacing between first and second media guide portions 71*a*, 71*b* define a width of the media path. A first toothed member 72*a* and a second toothed member 72*b* are attached in a generally transverse arrangement to a bottom portion of guide portions 71*a*, 71*b*. In addition, each guide portion 71*a*, 71*b* includes at least one foot 74.

In one embodiment of printer 1, one or both of guide portions 71*a*, 71*b* include a sensor 75. Sensor 75 is adapted to detect the presence and/or absence of a print media in media guide assembly 70 and is in communication with control circuitry on printed circuit board 20. Sensor 75 may be an optical sensor, a mechanical sensor, or another suitable sensor as is known in the art. The presence or absence of print media, as determined by sensor 75, influences functions of printer 1 according to programming within the control circuitry. By way of example only, the absence of print media may inhibit operation of motor 46, provide audible or visible indication of the absence of print media, or inhibit printing operations.

Movement of first and second support members 51*a*, 51*b* will now be discussed with reference to FIGS. 4 and 4A. Platen bracket 40 includes guide slots 33*a*, 33*b*, 33*c*, 33*d*, 33*e*, and 33*f*, holding slots 34*a*, 34*b*, and holding arms 35*a*, 35*b*. Additionally, platen bracket 40 includes guide slots 41*a*, 41*b*. Guide slots 33*a*, 33*b*, 33*c*, 33*d* are configured for slidably receiving feet 55 of first and second support members 51*a*, 51*b*. In particular, guide slots 33*a*, 33*b* slidably receive feet 55 of second support member 51*b* while guide slots 33*c*, 33*d* slidably receive feet of first support member 51*a*. Each guide slot 33*a*, 33*b*, 33*c*, and 33*d* has an enlarged end region adapted to receive foot 55 such that first or second support members 51*a* or 51*b* may be independently removed from platen bracket 40. In addition, first and second support members 51*a*, 51*b* include respective tabs 57*a*, 57*b* as seen in FIG. 4A. Guide slots 33*e*, 33*f* also include an enlarged end region adapted to receive tabs 57*a*, 57*b* respectively such that first or second support members 51*a* or 51*b* maybe independently removed from platen bracket. Guide slots 33*e*, 33*f* are configured for slidably receiving tabs 57*a*, 57*b* respectively, thereby maximizing the engagement between first and second support members 51*a*, 51*b* and platen bracket 40.

When positioned in platen bracket 40, first and second toothed members 56*a*, 56*b* are oriented towards each other and spaced apart to accommodate a gear 62 (FIG. 6) such that teeth on each of toothed members 56*a*, 56*b* mesh with gear 62. As shown in FIG. 6, first and second toothed members 56*a*, 56*b* mesh with gear 62 and may also include springs 68. Gear 62 is rotatably attached to the bottom surface of platen bracket 40 by a screw 66 and a washer 67. One end of each spring 68 is affixed to the bottom surface of platen bracket 40 while an opposing end is affixed to toothed members 56*a*, 56*b*. Springs 68 normally bias toothed members 56*a*, 56*b* towards each other thereby biasing support members 51*a*, 51*b* towards each other to hold media supply 53 in media storage assembly 50. Additionally, movement of one support member 51*a* or 51*b* moves respective toothed member 56*a* or 56*b* that rotates gear 62 which, in turn, moves opposing toothed member 56*b* or 56*a* in an opposing direction such that the other support member 51*b* or 51*a* moves a corresponding amount in an opposing direction thereby providing substantially balanced and equal movement of support members 51*a*, 51*b* (i.e. synchronized movement). If no media supply 53 is disposed in media storage assembly 50, support members 51*a*, 51*b* are maintained proximal to one another (FIG. 5) by the applied bias of springs 68.

Referring again to FIGS. 4 and 4A, in one embodiment of printer 1, first and second holding arms 35*a*, 35*b* are flexibly attached to platen bracket 40 and extend into respective first and second holding slots 34*a*, 34*b*. Holding arms 35*a*, 35*b* are biased towards a first position that is substantially parallel with the respective holding slot 34*a*, 34*b* and are independently positionable throughout a plurality of positions. Corresponding to holding arms 35*a*, 35*b* are toothed members 56*a*, 56*b* of respective first and second support members 51*a*, 51*b*.

First and second support members 51*a*, 51*b* are installed in platen bracket 40 as follows. Each support member 51*a*, 51*b* is positioned near a wall of platen bracket 40 such that feet 55 are aligned with the enlarged end region of guide slots 33*a-d* and tabs 57*a*, 57*b* are aligned with the enlarged end regions of guide slots 33*e-f*. When first and second support members 51*a*, 51*b* are aligned, toothed members 56*a*, 56*b* are also aligned with respective holding arms 35*a*, 35*b* in holding slots 34*a*, 34*b*. Since feet 55 and tabs 57*a*, 57*b* are aligned with the enlarged end portions of their respective guide slots, as first and second support arms 51*a*, 51*b* are moved towards platen bracket 40, toothed members 56*a*, 56*b* are slidably received in holding slots 34*a*, 34*b* respectively. In addition, toothed members 56*a*, 56*b* deflect respective holding arms 35*a*, 35*b* in a generally downward direction as support arms 51*a*, 51*b* are moved in a generally downward direction.

After support members 51*a*, 51*b* are positioned in platen bracket 40, movement of support members 51*a*, 51*b* towards each other disengage toothed members 56*a*, 56*b* from a top surface of holding arms 35*a*, 35*b* thereby allowing the bias of holding arms 35*a*, 35*b* to return them into a substantially parallel alignment with their respective holding slots 34*a*, 34*b*. Extensions on feet 55 and tabs 57*a*, 57*b* slidably engage portions of the bottom surface of platen bracket 40 (see FIG. 4A) thereby retaining support members 51*a*, 51*b* in platen bracket 40. In this configuration, support arms 51*a*, 51*b* are capable of movement towards and away from the center of platen bracket 40 while remaining slidably engaged in platen bracket 40.

As support arms 51*a*, 51*b* move towards outside walls of platen bracket 40, tabs 57*a*, 57*b* contact ends of holding arms 35*a*, 35*b* thereby inhibiting additional outward movement of support members 5la, 51*b*. In particular, holding arms 35*a*, 35*b* are configured such that when toothed members 56*a*, 56*b* contact the ends of holding arms 35*a*, 35*b*, feet 55 and tabs 57*a*, 57*b* are positioned inboard of the enlarged end portions of their respective guide slots, thereby preventing feet 55 and tabs 57*a*, 57*b* from aligning with the enlarged end portions of their respective guide slots to retain support members 51*a*, 51*b* in platen bracket 40.

Support members 51*a*, 51*b* may be removed from platen bracket 40 as follows. Prior to or concurrently with outward movement of support members 51*a*, 51*b*, holding arms 35*a*, 35*b* are urged generally downwards to overcome their normal bias, thereby repositioning them such that their ends will not engage toothed members 56*a*, 56*b*. Continued outward movement of support members 51*a*, 51*b* position toothed members 56*a*, 56*b* such that they slidingly contact the top surface of holding arms 35*a*, 35*b*. By positioning toothed members 56*a*, 56*b* on the top surface, the deflection of holding arms 35*a*, 35*b* is maintained and toothed members 56*a*, 56*b* may slide along and permit support members 51*a*, 51*b* to be moved outwards towards the walls of platen bracket 40. In particular, support members 51*a*, 51*b* are moved such that feet 55 and tabs 57*a*, 57*b* are aligned with the enlarged end portions of their respective guide slots, thereby allowing generally upward motion to remove support members 51*a*, 51*b* from platen bracket 40.

Additionally, platen bracket 40 includes guide slots 41*a*, 41*b* that are adapted for slidably receiving feet 74 of first and second guide portions 71*a*, 71*b*. Each guide slot 41*a*, 41*b* includes an enlarged portion adapted for receiving foot 74 in a manner such that each guide portion 71*a*, 71*b* may be installed or removed from platen bracket 40. With guide portions 71*a*, 71*b* disposed in platen bracket 40, respective toothed members 72*a*, 72*b* are oriented towards each other and spaced apart to accommodate a gear 64 (FIG. 6) such that teeth on each of toothed members 72*a*, 72*b* mesh with gear 64.

Figure 6:
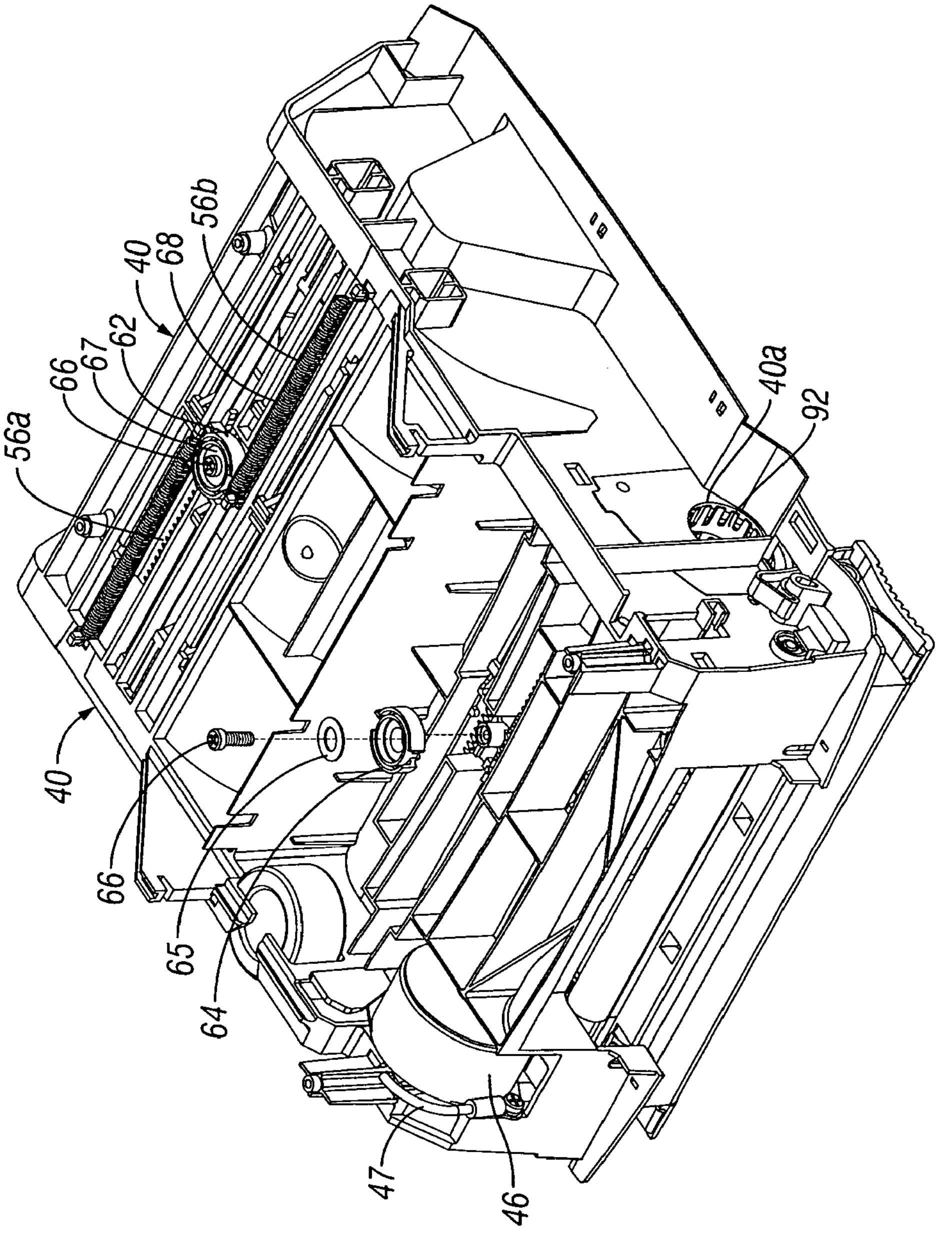
FIG. 6 is a front perspective view of the platen bracket of FIG. 5 shown in an inverted position.

As shown in FIG. 6, first and second toothed members 72*a*, 72*b* mesh with gear 64. Gear 64 is rotatably attached to the bottom surface of platen bracket 40 with a screw 66 and a washer 65. In one embodiment of printer 1, washer 65 has a generally wavy shape thereby imparting a desired amount of frictional resistance (i.e. drag) to movement of gear 64. By including a wavy washer 65 in cooperation with gear 64, drag is provided to gear 64 to minimize movement of guide portions 71*a*, 71*b* after they are located in their desired positions. Washer 65 and gear 64 are maintained in position on the platen bracket 40 by a platen bracket undercover (not shown). Movement of one guide portion 71*a* or 71*b* moves respective toothed member 72*a* or 72*b* that rotates gear 64 which, in turn, moves opposing toothed member 72*b* or 71*a* in an opposing direction such that the other guide portion 71*b* or 71*a* moves a corresponding amount in an opposing direction thereby providing substantially balanced and equal movement of guide portions 71*a*, 71*b* (i.e. synchronized movement).

In one embodiment, media storage assembly 50 is adapted for locking support members 51*a*, 51*b* in an open position wherein a predetermined distance between support members 51*a*, 51*b* is maintained without additional user intervention as would be desirable prior to loading a quantity of print media 53. Referring to FIG. 4A, platen bracket 40 further includes first and second ramp members 40*b*, 40*c* that form a locking assembly. As support members 51*a*, 51*b* are moved towards a wall of platen bracket 40, a bottom surface of second support member 51*b* slidably engages ramp member 40*b* thereby resulting in support member 51*b* tilting away from roller 49. After a the bottom surface of second support member 51*b* disengages from ramp member 40*b* (i.e. after it slides past the apex of ramp member 40*b*), the bottom surface of support member 51*b* now contacts the bottom of platen bracket 40 and second support member 51*b* is no longer tilted away from roller 49 (i.e. now substantially upright).

Movement of second support member 51*b* towards the center of platen bracket 40 is inhibited by the engagement of edge A of second support member 51*b* and a vertical surface of ramp member 40*b*. As discussed hereinabove, support members 51*a*, 51*b* are configured to move substantially in unison. Since inwards movement of second support member 51*b* is inhibited by ramp member 40*b*, inwards movement of support member 51*a* is also inhibited, thereby locking media storage assembly 50 in the open position. By applying force to second support member 51*b* in a direction away from roller 49, the bottom surface of second support member 51*b* depresses second ramp member 40*c*, thereby allowing second support member to tilt away from roller 49 and disengaging edge A from the vertical surface of first ramp member 40*b*. With second support member 51*b* tilted away from roller 49 and edge A disengaged from first ramp member 40*b*, second support member 51*b* is no longer inhibited from movement towards the center of platen bracket 40 and media storage assembly 50 is now in the unlocked position. Support members 51*a*, 51*b* are now capable of movement towards the center of platen bracket 40 by the bias of springs 68 (see FIG. 6).

Figure 6A:
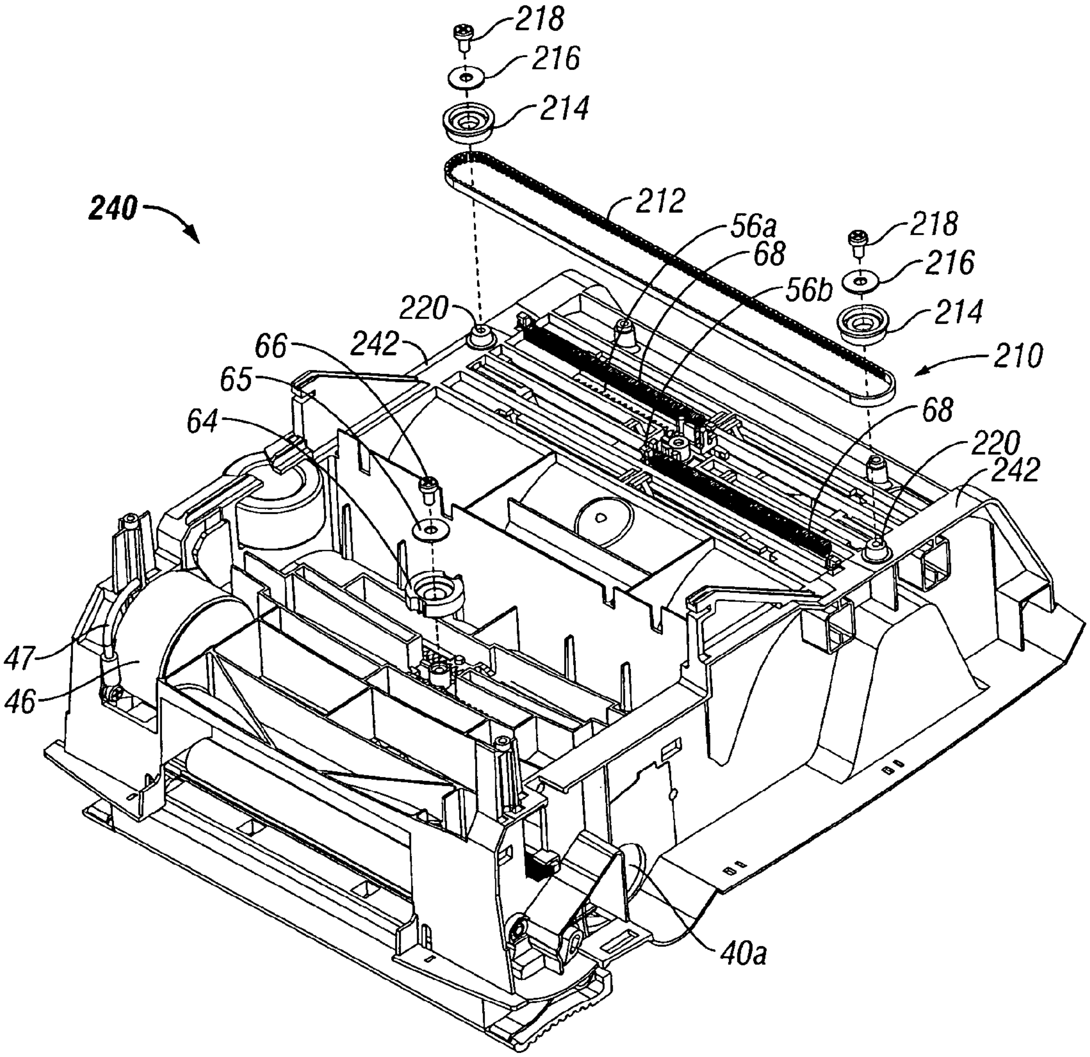
FIG. 6A is an alternate embodiment of the platen bracket of FIG. 6 including an exploded view of a drive mechanism.
Figure 6B:
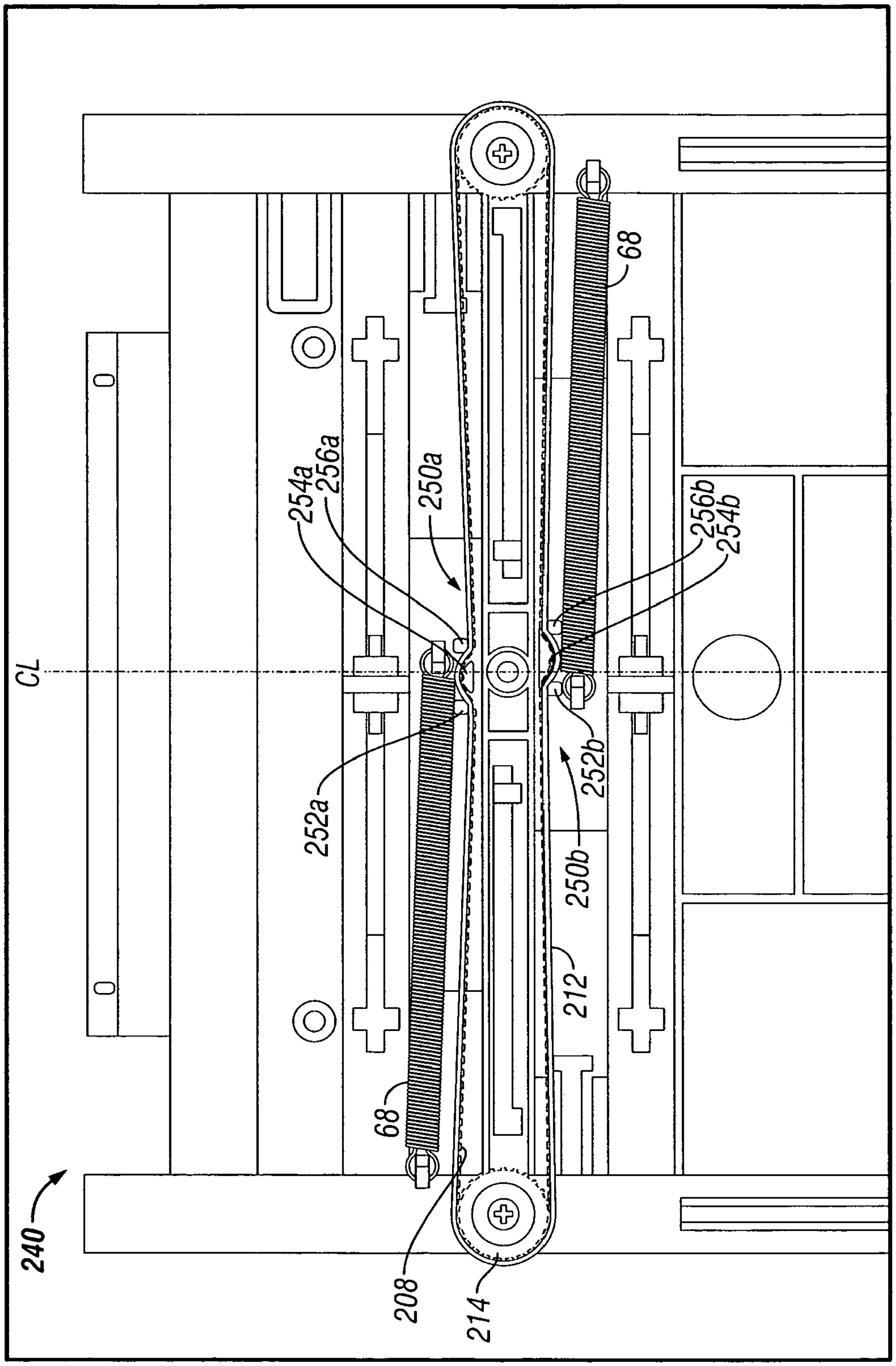
FIG. 6B is a bottom plan view of the platen bracket of FIG. 6A illustrating the assembled drive mechanism of FIG. 6A.

An alternate embodiment of the presently disclosed platen bracket is illustrated in FIGS. 6A and 6B and is identified generally as 240. In this embodiment, platen bracket 240 includes the same or substantially similar components as platen bracket 40 (FIG. 6) and, for the sake of brevity, will not be discussed in detail hereinafter. When support members 51*a*, 51*b* (FIG. 4) are repositioned away from a centerline CL (FIG. 6B) and towards outside walls of platen bracket 240, toothed members 56*a*, 56*b*, respectively, overcome the bias applied by springs 68 during their movement towards the outside walls. As each support member 51*a*, 51*b* moves towards the outside walls, a belt assembly 210 simultaneously moves proportionally to the movement of support members 51*a*, 51*b*.

Belt assembly 210 includes a pair of support posts 220, wherein each support post 220 includes a threaded opening at a top thereof for threadably receiving a fastener 218. In addition, each support post 220 rotatably receives a pulley 214 having an annular flange thereon. In one embodiment, each pulley 214 includes a plurality of teeth that are shown in phantom in FIG. 6B. Pulley 214 is rotatable about a central axis of support post 220 and is retained to support post 220 using fastener 218 in cooperation with an optional washer 216 that is disposed between a head of fastener 218 and a recess of pulley 214. Pulleys 214 are disposed along a common axis that is substantially transverse to centerline CL of platen bracket 240. Each pulley 214 is located on a frame member 242.

Further still, belt assembly 210 includes a timing belt 212 that has a plurality of teeth 208 disposed thereon. Teeth 208 are configured and dimensioned for meshingly engaging the teeth on each pulley 214 in those embodiments wherein each pulley 214 includes teeth. Timing belt 212 is a continuous member that has a generally oval configuration and operably couples pulleys 214. In particular, teeth 208 frictionally engage pulleys 214, such that movement of timing belt 212 results in corresponding rotational movement of pulleys 214 (i.e. clockwise or counter-clockwise). Referring to FIG. 6B, the drive path for timing belt 212 starts at one pulley 214, extends towards the other pulley 214, and returns to the first pulley 214 forming a complete drive loop.

In addition, timing belt 212 operably couples support members 51*a*, 51*b* to each other such that movement of one support member causes corresponding movement of the other support member in an opposing direction. Approximately midway between the pulleys 214, each support member 51*a*, 51*b* is operably coupled to timing belt 212 as follows. Each support member 51*a*, 51*b* includes an attachment assembly 250*a*, 250*b*. Attachment assembly 250*a* includes a plurality of posts 252*a*, 254*a*, and 256*a*, wherein each post extends perpendicularly to support member 51*a*. Post 254*a* may include a plurality of teeth that are adapted for frictionally engaging teeth 208 of timing belt 212. A portion of timing belt 214 frictionally engages posts 252*a*, 254*a*, and 256*a* such that teeth 208 are in opposition to posts 252*a* and 256*a* and a substantially smooth side of timing belt 212 contacts a face of posts 252*a*, 256*a* while teeth 208 frictionally engage the teeth of post 254*a*. This arrangement transfers linear movement of timing belt 212 to attachment assembly 250*a* and support member 51*a*. Attachment assembly 250*b* is substantially similar in arrangement and operation with support member 51*b*. Thus, movement of one support member (i.e. 51*a* or 51*b*) urges timing belt 212 to move along its path and causes the opposing support member (i.e. 51*b* or 51*a*) to move a corresponding distance in an opposite direction.

Figure 7A:
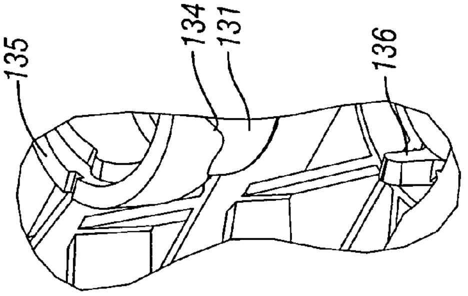
FIG. 7A is a detailed perspective view of a portion of a pressure adjustment assembly.
Figure 7:
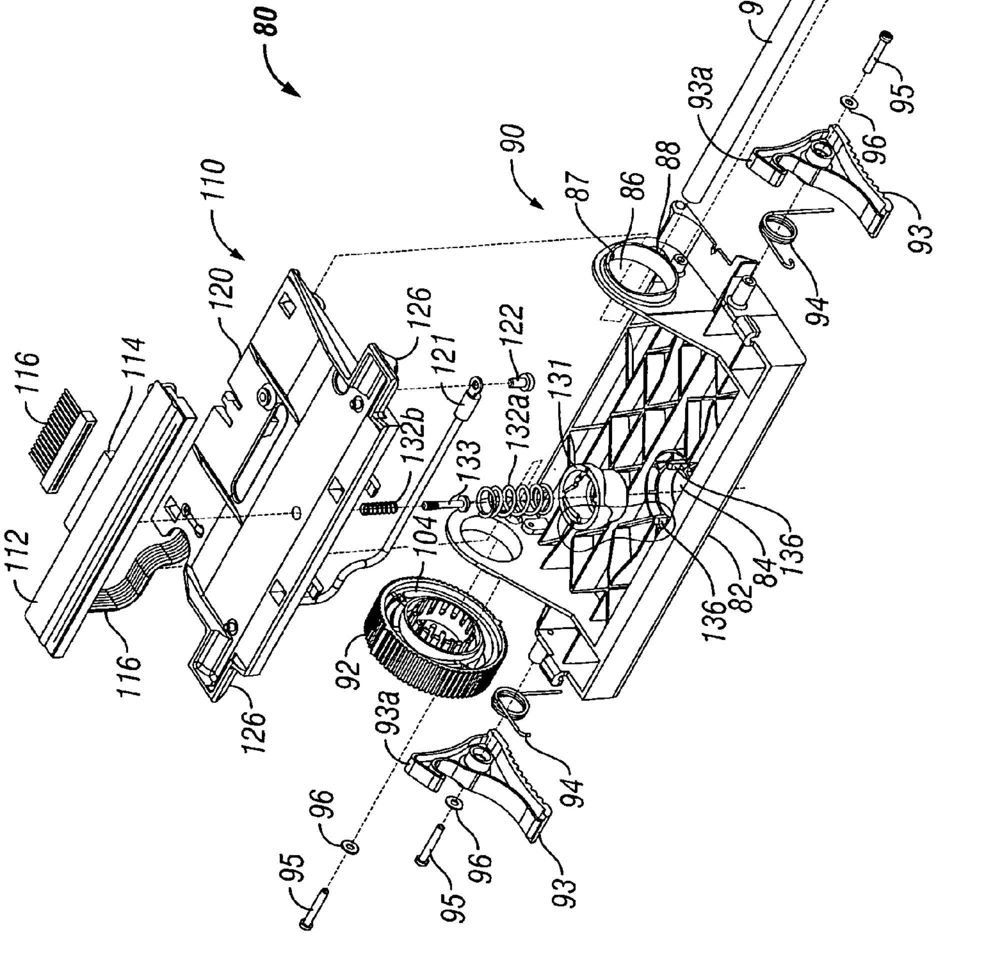
FIG. 7 is an exploded perspective view of a carrier assembly shown in an inverted position.
Figure 8:
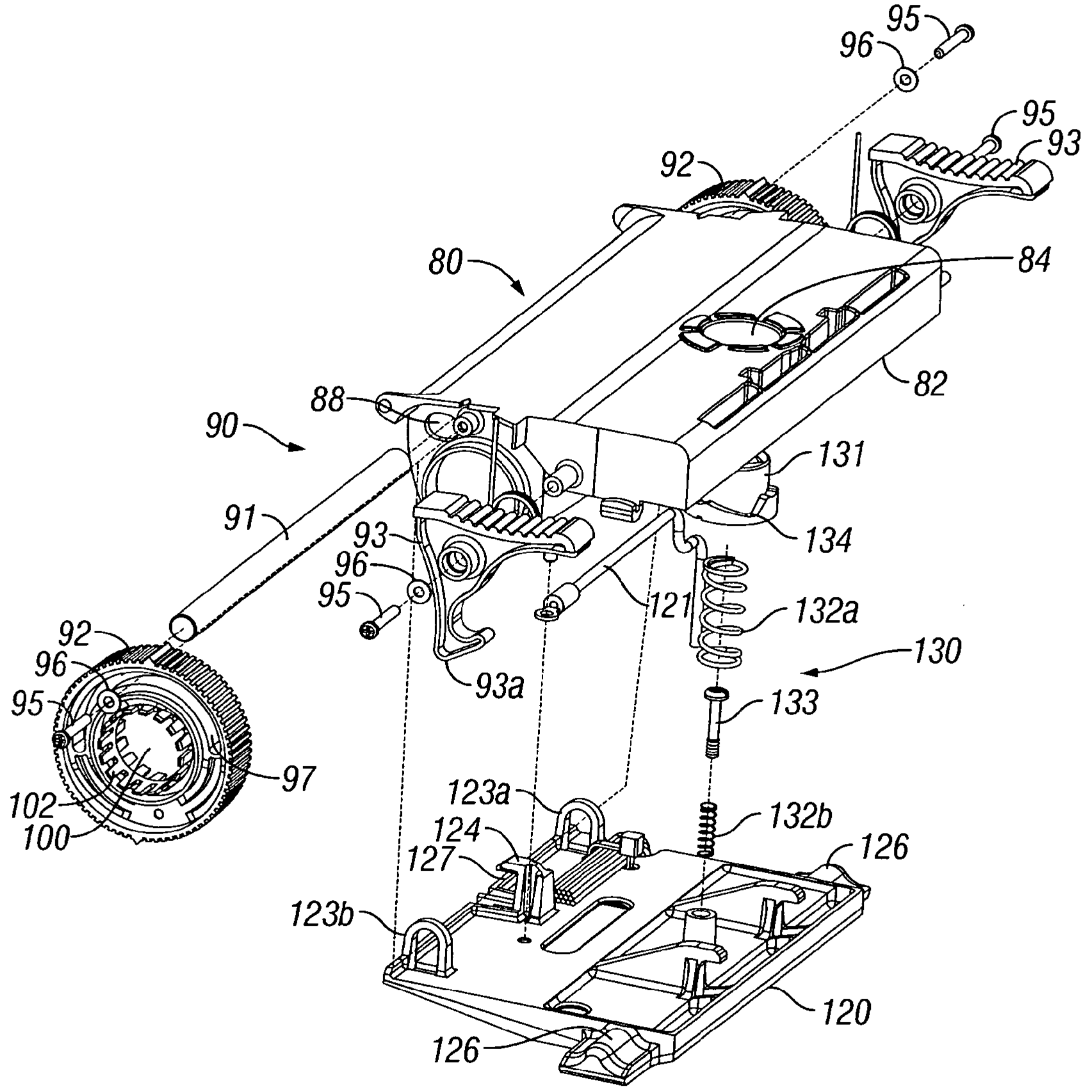
FIG. 8 is an exploded side perspective view of the carrier assembly of FIG. 7.
Figure 9:
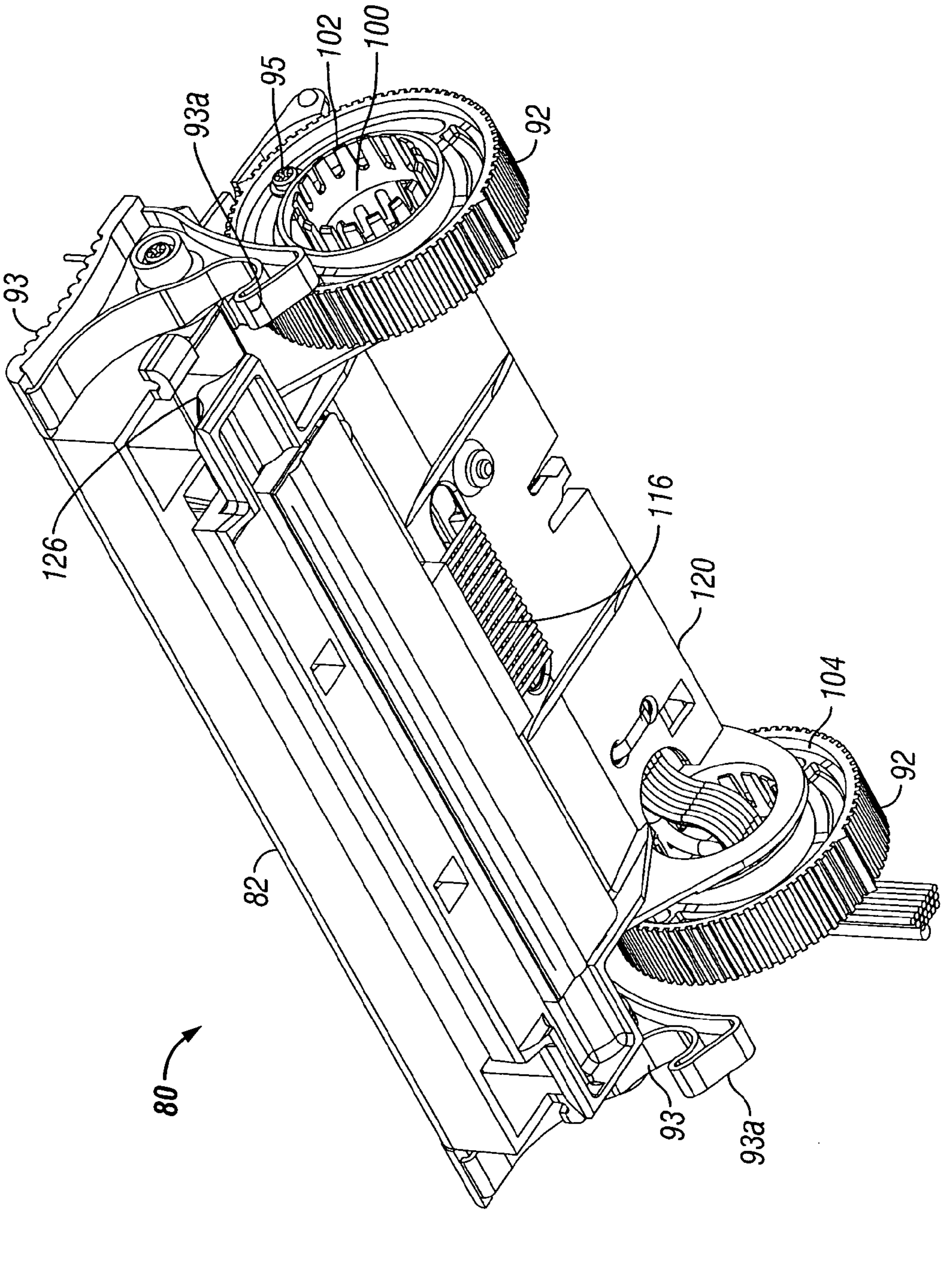
FIG. 9 is a perspective view of the assembled carrier assembly of FIG. 7.

Carrier assembly 80 is illustrated in FIGS. 7-9 and discussed in detail below. In one embodiment of printer 1, carrier assembly 80 includes a carrier bracket 82 for attaching a print adjustment assembly 90, a print assembly 110, and a pressure adjustment assembly 130 thereto. Carrier bracket 82 includes a throughhole 84 that is proximal to one end and a pair of openings 86 that are proximal to an opposing end of carrier bracket 82. In one embodiment, each opening 86 includes an outwardly extending rim 87 where openings 86 that are aligned along a longitudinal axis of carrier bracket 82 such that they face each other with rims 87 facing in a generally outward direction. A pair of elongate shaped (i.e. oval) holes 88 is disposed in proximity to openings 86.

Carrier assembly 80 is maintained in proximity to platen bracket 40 using a pair of carrier latches 93 as shown in FIG. 2. As shown in FIG. 7, carrier latches 93 are located on opposing sidewalls of carrier bracket 82. Screws 95 and washers 96 fasten carrier latches 93 to carrier bracket 82. A torsion spring 94 may be included for biasing each carrier latch 93 towards a first position. Once carrier bracket 80 is positioned and aligned in platen bracket 40, as will be discussed in detail hereinafter, latches 93 are aligned and engaged in recesses 48 of platen bracket 40 (FIG. 4) as follows. Each carrier latch 93 includes a finger 93*a* that is adapted to engage recess 48. As each finger 93*a* is inserted into recess 48, a portion of finger 93*a* contacts an interior surface of recess 48 and rotatably urges carrier latch 93 away from its first or biased position thereby allowing insertion of carrier latch 93 and finger 93*a* into recess 48. After additional movement of carrier latch 93 into recess 48, finger 93*a* is no longer in contact with an interior surface of recess 48 and bias supplied by torsion spring 94 urges carrier latch 93 towards it biased position whereupon finger 93*a* engages a portion of recess 48 and inhibits upward vertical movement of carrier assembly 80. By inhibiting upward vertical movement of carrier bracket 80, a desired spacing between roller 49 and carrier bracket 80 is maintained. This arrangement minimizes upward movement of carrier bracket 80 in response to upward forces applied to carrier bracket 80 during printing operations.

Print assembly 110, as illustrated in FIG. 7, includes a print head 112 attached to an adapter plate 120. Print head 112 is attached to adapter plate 120 using spring 132*b* in cooperation with screw 133. Print head 112 includes a connector 114 for receiving a ribbon cable 116. In one embodiment, print head cable 116 is also electrically coupled to printed circuit board 20 and is capable of communicating signals between print head 112 and printed circuit board 20. A ground wire 121 is provided and attached to adapter plate 120 with screw 122.

As seen in FIG. 8, adapter plate 120 includes first and second shaft brackets 123*a*, 123*b* and a pivot bracket 124. Shaft brackets 123*a*, 123*b* and pivot bracket 124 are located proximal to one end of adapter plate 120 and are in substantial alignment with each other. Shaft brackets 123*a*, 123*b* are generally closed structures while pivot bracket 124 may include an opening 127 along one side. A pair of arms 126 is disposed proximal to an opposing end of adapter plate 120 where each arm 126 extends outwardly from an edge of adapter plate 120. Each arm 126 has a generally curved surface oriented in the same direction as pivot bracket 124 and facing carrier bracket 82.

Interspaced between adapter plate 120 and carrier bracket 82 is pressure adjustment assembly 130 as seen in FIG. 8. Pressure adjustment assembly 130 includes a hub 131, a spring 132*a* for attaching pressure adjustment assembly 130 to adapter plate 120, and at least one post 136. Spring 132*a* biases hub 131 towards posts 136 and biases adapter plate 120 away from carrier bracket 82. In particular, spring 132*a* biases print head 112 towards roller 49 and maintains a desired amount of pressure therebetween as will be discussed in detail hereinafter. A portion of hub 131 is received in throughhole 84 allowing the applied pressure of print head 112 to be adjusted without having to remove print head 120 or carrier assembly 80 from printer 1.

Referring now to FIGS. 7, 7A, and 8, hub 131 has a ridge 134 along an outside surface thereof that includes a series of ramps defining a series of angles with respect to a bottom surface 135 of hub 131. Hub 131 is positionable among a plurality of positions including a first or minimum pressure position, a second or maximum pressure position, and at least one pressure position therebetween. In addition, hub 131 is disposed in throughhole 84 such that ridge 134 slidably engages posts 136. As hub 131 rotates among the plurality of positions, ridge 134 rides along posts 136. Since ridge 134 includes a series of ramps, as hub 131 rotates among the plurality of positions, hub 131 compresses or relaxes spring 132*a*. In the minimum pressure position, hub 131 is positioned such that spring 132*a* is in a relatively relaxed state, thereby applying a minimum amount of force to adapter plate 120 and print head 112 applies a minimum amount of pressure against print media 53. As hub 131 is rotated towards the maximum pressure position, movement of ridge 134 along posts 136 compresses spring 132*a*, thereby applying more force to adapter plate 120 and print head 112 applies an increasing amount of pressure against print media 53 that is proportional to the compression of spring 132*a*.

In addition to rotatable movement, adapter plate 120, and thus print head 112, is also capable of being pivoted about a central point using print adjustment assembly 90 as discussed herein. Print adjustment assembly 90 includes a shaft 91 and at least one thumbwheel 92. Shaft 91 is disposed through elongate holes 88 of carrier bracket 82. Elongate holes 88 and shaft 91 are configured and dimensioned such that shaft 91 is rotatable in elongate holes 88 and also positionable along a longitudinal axis thereof Shaft 91 is slidably received in a groove 104 of the at least one thumbwheel 92. In one embodiment, the at least one thumbwheel 92 includes an aperture 97 for receiving screw 95. Aperture 97 is generally arcuate to correspond to the curvature of thumbwheel 92 and is located along a peripheral region of thumbwheel 92. In this configuration, the at least one thumbwheel 92 is eccentrically attached to shaft 91. In addition, the at least one thumbwheel 92 includes a central orifice 100 with a plurality of fingers 102 extending along an inner circumference thereof. Fingers 102 slidingly engage an inner surface of opening 86 such that the at least one thumbwheel 92 is rotatable in openings 86. The at least one thumbwheel 92 is attached to carrier bracket using screw 95 and washer 96.

The at least one thumbwheel 92 is rotatable and capable of positioning shaft 91. Shaft 91 is positioned such that it extends through shaft brackets 123*a*, 123*b* and pivot bracket 124. In one embodiment, shaft 91 does not contact inner surfaces of shaft brackets 123*a*, 123*b* or pivot bracket 124. Groove 104 of the at least one thumbwheel 92 engages an end of shaft 91 and the at least one thumbwheel 92 is attached to carrier bracket 82 using screws 95 and washers 96 thereby fastening shaft 91 to carrier assembly 80 and providing a rotating surface for adapter plate 120 for adjusting a distance between print head 112 and roller 49 as discussed above.

In an embodiment of carrier assembly 80, adapter plate 120, to which print head 112 is attached, is also pivotable about pivot bracket 124 in addition to being rotatable on shaft 91 along an axis thereof. Since shaft brackets 123*a*, 123*b* are enclosed structures, they maintain the relative position of shaft 91 to adapter plate 120 while allowing shaft 91 to rotate freely.

However, pivot bracket 124 has at least one open side 127 thereby providing greater range of motion to shaft 91 in pivot bracket 124. By providing a greater range of motion to shaft 91, adapter plate 120, and ultimately print head 112, may be pivoted about pivot bracket 124 as detailed below.

In an embodiment having a pair of thumbwheels 92, each thumbwheel 92 is rotatably attached to carrier bracket 82 such that each thumbwheel 92 is capable of independent rotation. With screw 95 loosely contacting thumbwheel 92, rotation of thumbwheel 92 causes rotational forces to be transferred to shaft 91 through the engagement of an end of shaft 91 and groove 104 in thumbwheel 92. Since shaft 91 is axially offset from a center of thumbwheel 92, the resulting eccentric motion urges shaft 91 to move along the longitudinal axis of elongate hole 88. Once shaft 91 is moved into contact with the inner surface of one of shaft brackets 123*a* or 123*b*, continued longitudinal movement of shaft 91 urges adapter plate 120 to move a corresponding amount in a corresponding direction. While one thumbwheel 92 is rotating, the other thumbwheel 92 may be held stationary thereby acting as a pivot point for shaft 91 and adapter plate 120. In this configuration, the alignment between print head 112 and roller 49 may be altered to accommodate operating parameters of printer 1 (i.e. print head 112 is skewed in relation to roller 49). Additionally, both thumbwheels 92 may be rotated to alter the alignment between print head 112 and roller 49 in the manner described above. Alternatively, thumbwheels 92 may be operated substantially simultaneously to alter the alignment between print head 112 and roller 49. Independent rotation of thumbwheels 92 modifies the angular relationship between print head 112 and roller 49 while simultaneous rotation of thumbwheels 92 will modify the lateral relationship between print head 112 and roller 49. Once the desired alignment is attained, screws 95 may be tightened to minimize alteration of the desired alignment.

Figure 4:
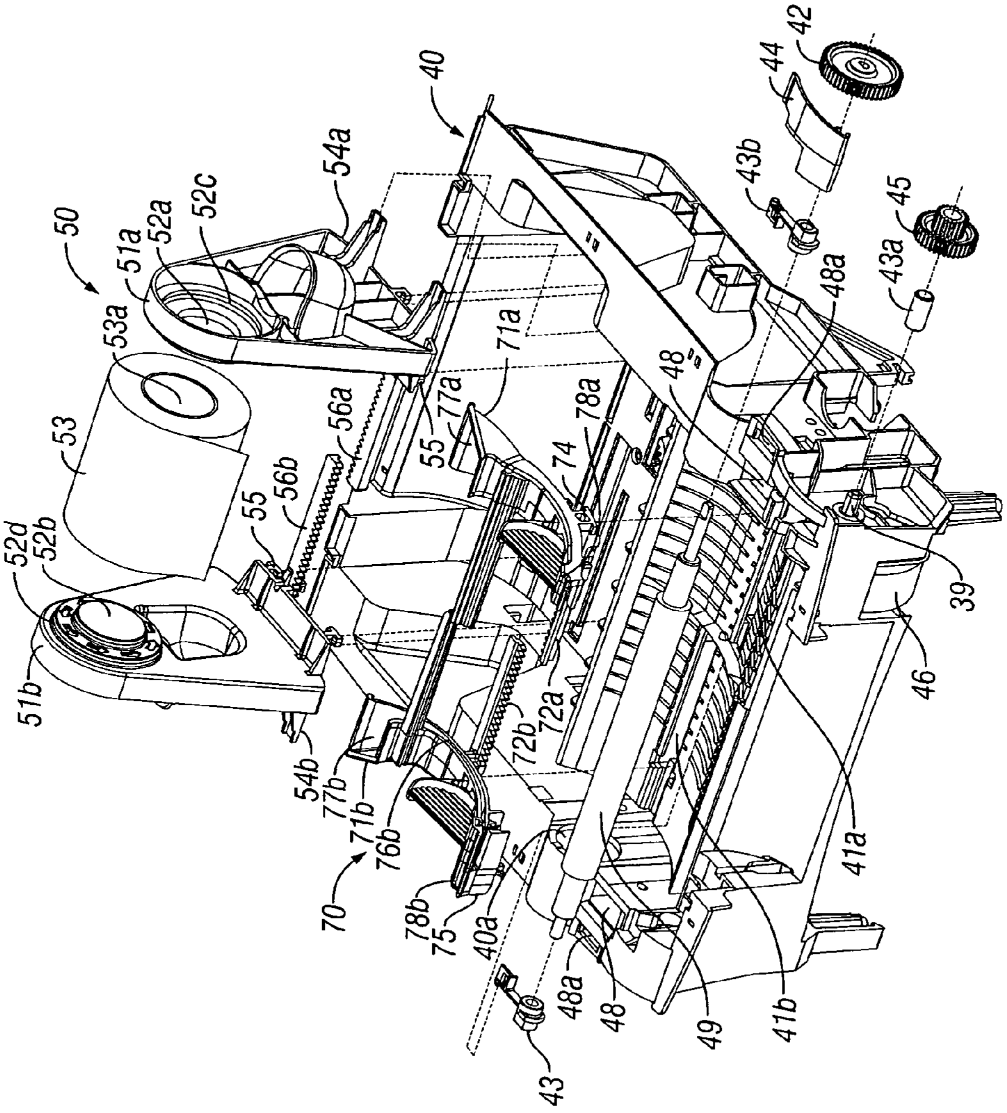
FIG. 4 is an exploded front perspective view of a platen bracket.
Figure 4A:
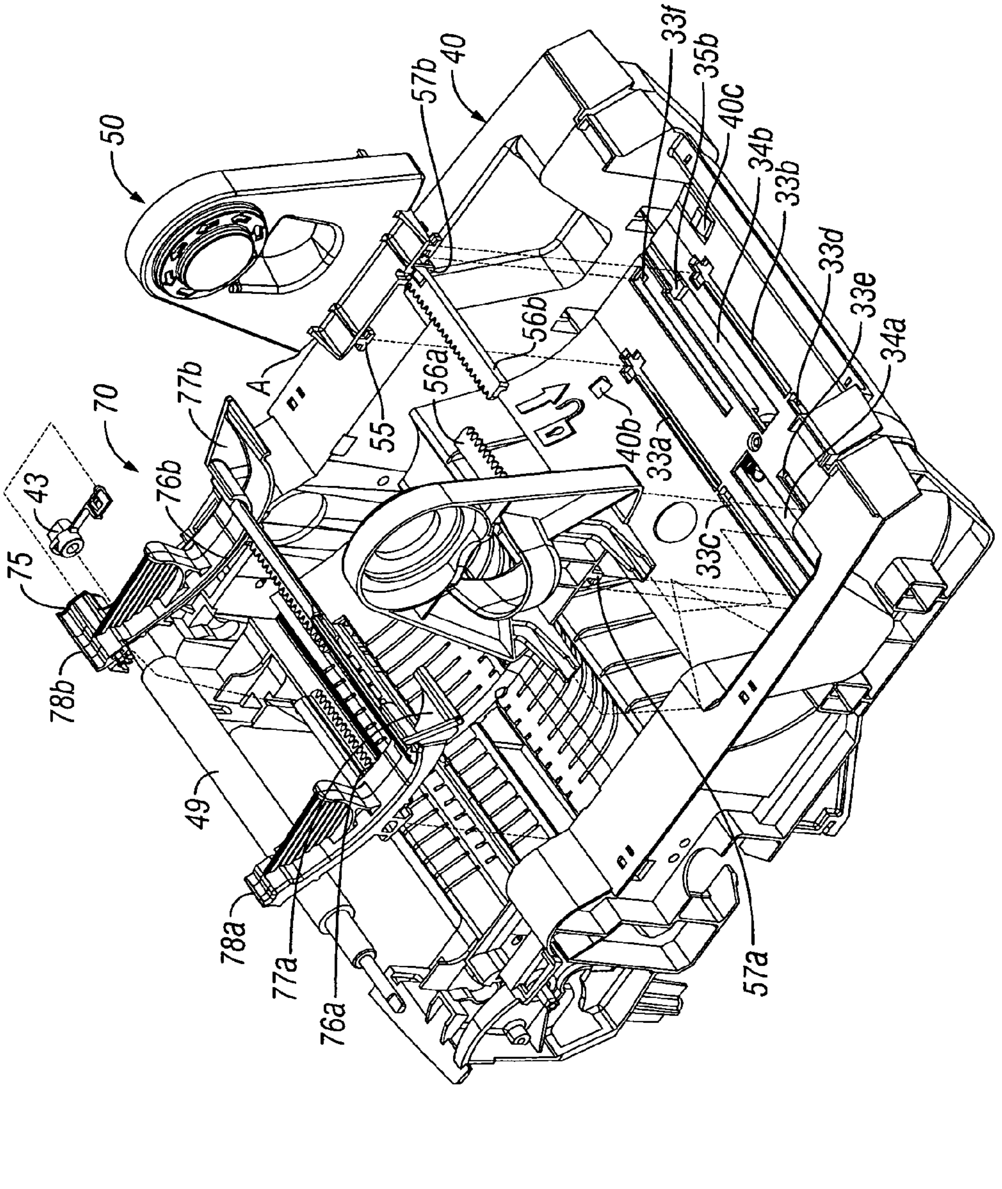
FIG. 4A is an exploded side perspective view of the platen bracket of FIG. 4.
Figure 5:
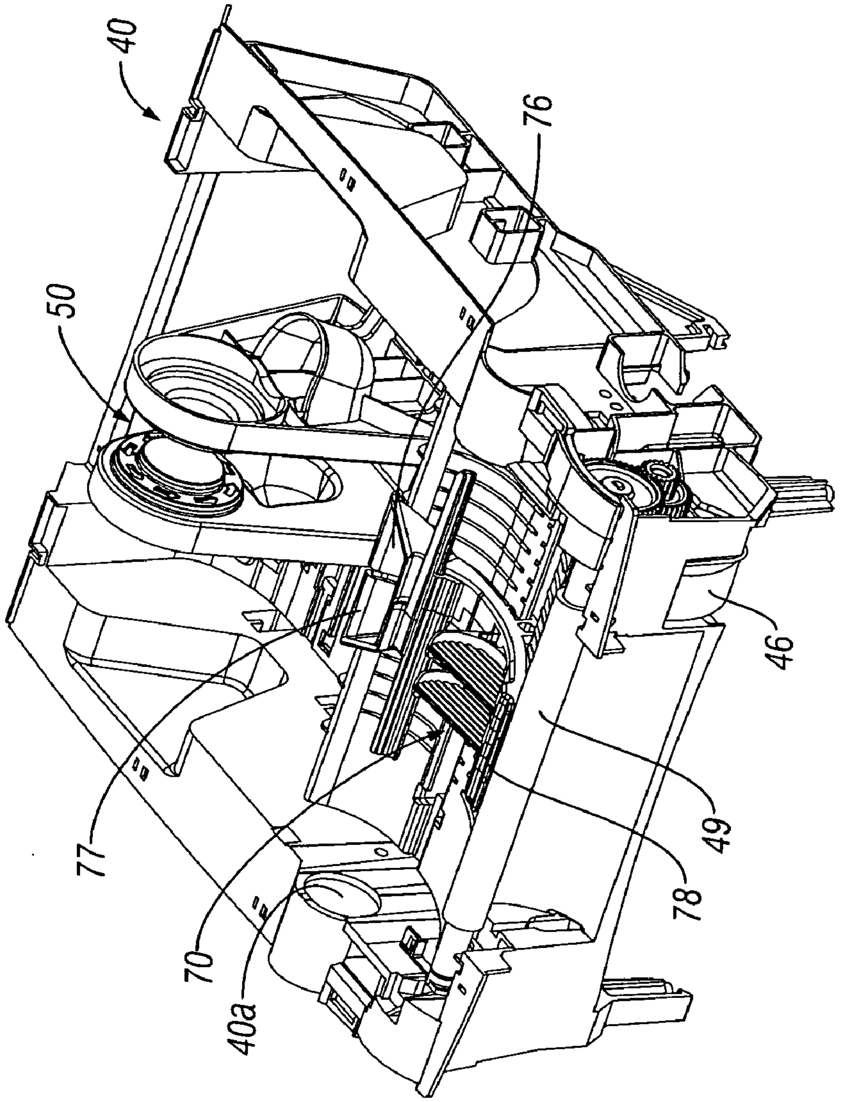
FIG. 5 is a front perspective view of the platen bracket of FIG. 4.

In addition, thumbwheels 92 are adapted for positioning and attaching carrier assembly 80 to platen bracket 40 wherein each thumbwheel is adapted to be received by an opening 40*a* (see FIGS. 4 and 6). Thumbwheels 92 are rotatable between an installation state and an adjustment state. In the installation state, thumbwheels 92 are in proximity to carrier assembly 80. After carrier assembly 80 is aligned with platen bracket 40, thumbwheels 92 are rotated whereupon each thumbwheel 92 moves in a generally longitudinal direction outwards from a center of carrier assembly 80 such that each thumbwheel 92 is received in a corresponding opening 40*a*, thereby attaching carrier assembly 80 to platen bracket 40. Once thumbwheels 92 are received in openings 40*a*, thumbwheels 92 are in the adjustment state and additional rotation of thumbwheels 92 adjusts print head 112 as discussed hereinabove.

By providing print adjustment assembly 90, printer 1 may be field calibrated or aligned by an operator or field service personnel thereby reducing "down-time" or unavailability of the printer as well as reducing the operating and maintenance cost of the printer to the customer.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. A printer comprising:

a housing;

a media guide disposed in the housing;

a media storage assembly disposed in the housing, the media storage assembly including first and second support members; and a movable member operably coupling the first and second support members such that movement of one support member a predetermined distance causes the other support member to move a corresponding distance in a direction opposite to that of the first support member, the movable member repositionable along an axis substantially transverse to the central axis of the housing, wherein the housing further includes a locking assembly configured to selectively lock the first and second support members, the locking assembly including first and second ramp members.

2. The printer of claim 1 further comprising at least one biasing member operably connecting at least one of the support members to the housing, the at least one biasing member biasing the at least one support member towards the central axis of the housing.

3. The printer of claim 1, wherein repositioning the first support member towards a wall of the housing causes the first support member to engage a portion of the first ramp member thereby inhibiting movement of the first support member away from the wall of the housing.

4. The printer of claim 1 further comprising a print assembly, the print assembly including a print head.

5. The printer of claim 1 further comprising:

a platen bracket;

a printed circuit board attached to a bottom surface of the platen bracket;

a carrier assembly attached to the platen bracket, the carrier assembly including a print head;

a cover having a pair of latches wherein each latch is adapted to releasably engage a slot in the platen bracket for attaching the platen bracket to the cover thereby maintaining a fixed spatial relationship between the cover, the carrier assembly, the platen bracket, and the printed circuit board; and a base attachable to the platen bracket.

6. The printer of claim 5, wherein the cover is hingedly attached to the platen bracket and the base is cooperative with the cover thereby inhibiting removal of the cover when the base is attached to the platen bracket.

7. The printer of claim 5 further comprising:

a motor disposed in the housing;

a media guide disposed in the housing; and a printed circuit board disposed in the housing, wherein the printed circuit board is operatively coupled to the motor and the print head for controlling operations of the motor and the print head.

8. The printer of claim 1, wherein the first support member is configured to selectively engage the first ramp member and the second support member is configured to selectively engage the second ramp member.

9. The printer of claim 1, wherein the first and second ramp members are configured to selectively lock the first and second support members in a predetermined arrangement defining a predetermined space there between.

10. The printer of claim 1, wherein the first and second ramp members are formed on the housing.

* * * * *